United States Patent [19]

Thomas

[11] 3,972,359

[45] Aug. 3, 1976

[54] VIBRATION RESISTANT FASTENER

[75] Inventor: William J. Thomas, Glenside, Pa.

[73] Assignee: Standard Pressed Steel Co., Jenkintown, Pa.

[22] Filed: May 17, 1974

[21] Appl. No.: 470,873

[52] U.S. Cl. ................................. 151/22; 151/37
[51] Int. Cl.² ................................. F16B 39/30
[58] Field of Search .............. 151/22, 37, 14 R, 70; 85/41, 43, 46, 47

[56] References Cited
UNITED STATES PATENTS

| | | | |
|---|---|---|---|
| 3,078,899 | 2/1963 | MacLean | 151/37 |
| 3,339,389 | 9/1967 | Mosow | 151/22 |
| 3,605,845 | 9/1971 | Junker | 151/37 |

FOREIGN PATENTS OR APPLICATIONS

| | | | |
|---|---|---|---|
| 71,848 | 11/1893 | Germany | 151/22 |

Primary Examiner—Roy D. Frazier
Assistant Examiner—Thomas J. Holko
Attorney, Agent, or Firm—Andrew L. Ney; Aaron Nerenberg

[57] ABSTRACT

A vibration resistant threaded fastener such as a set screw and method of forming the fastener wherein the load bearing flank of the thread surface of the screw is provided with a series of serrations. Each serration is formed with an inclined ramp terminating in a buttress forming a skewed angle with the radius of the fastener. The ramp surface is inclined in the direction of tightening the fastener so that the buttress presents a surface tending to act against rotation of the fastener to preclude its loosening. In forming the vibration resistant fastener a pair of flat thread roll dies may be used. Each die is provided with a mating segment near the end of the effective thread forming portion of the die having a configuration designed to impart the ramp and buttress serrations on the load bearing flank of the fastener rolled between the dies.

7 Claims, 12 Drawing Figures

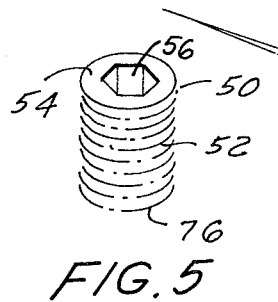
FIG. 5
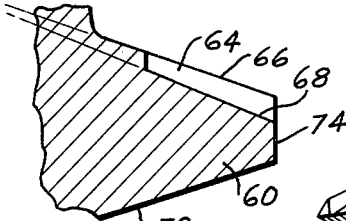
FIG. 11A
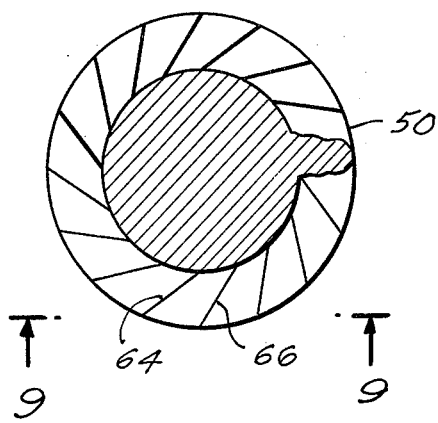
FIG. 6
FIG. 7
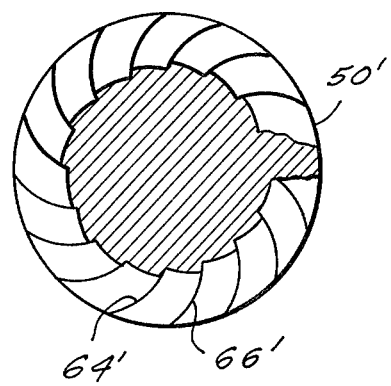
FIG. 8
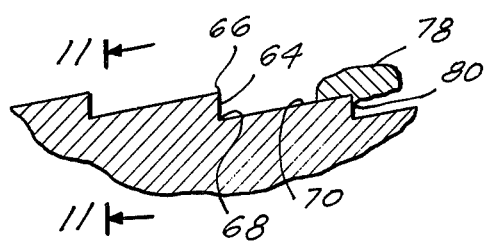
FIG. 9
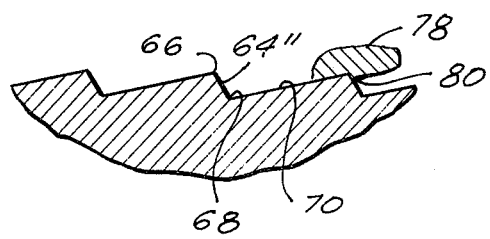
FIG. 10
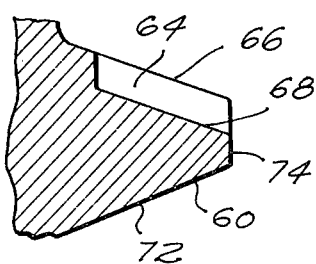
FIG. 11

VIBRATION RESISTANT FASTENER

The present invention relates to vibration resistant threaded fasteners and more particularly to vibration resistant screws such as set screws, such as described in commonly assigned copending applications Ser. No. 470,848, filed May 17, 1974, which is a continuation of application Ser. No. 257,730, filed May 30, 1972, now abandoned, and Ser. No. 470,874, filed May 17, 1974.

In many applications utilizing a set screw, the set screw is threadably engaged within one workpiece to have an end bear against and frictionally grip a second workpiece to secure the two workpieces together. In such an application it is imperative, especially where the workpieces are subjected to vibration, to insure that the set screw does not loosen so that the workpieces can move relative to each other. Accordingly, set screws have been designed with anti-rotation features in an attempt to minimize loosening or back-off of the set screw when the workpieces in which it is installed are subjected to vibration. One suggested solution is to provide the seating end or point of the set screw with an irregular configuration, for example a knurled cup configuration, so that the knurled end of the set screw achieves a degree of purchase when it bears against the surface of the workpiece. However, the surface area of the set screw end is necessarily limited so that the frictional engaging surface is also limited and such set screws have not provided an entirely satisfactory rotation resistant feature.

Accordingly, it is an object of the present invention to provide a rotation resistant threaded fastener such as a set screw which has noticeably improved rotation resistant properties when installed in a workpiece and a method for making such a fastener.

It is a still further object of the present invention to provide a rotation resistant threaded fastener with improved rotation resistant properties and which may be readily and economically manufactured.

It is a still further object of the present invention to provide a threaded fastener which exhibits markedly improved rotation resistant properties and which may be repeatedly engaged and disengaged from the workpieces in which it is employed without marked deterioration in the rotation resistant property of the fastener.

In accordance with a preferred embodiment of the present invention an irregular surface configuration is imparted to the flank of the threads of a threaded fastener member which bears the load when the fastener is in compressive loading. The irregular surface configuration on the thread flank is in the form of an inclined ramp and buttress disposed at a skewed angle with respect to a radial of the fastener with the incline of the ramp being in the direction of rotation to engage the threaded fastener. Thus, once the fastener is fully seated and engaged the buttress of each of the serrations resists the tendency of the threaded fastener to rotate in the opposite direction and back off.

These and other objects and advantages of the present invention will be more readily apparent after consideration of the following specification in conjunction with the drawing.

In the drawing:

FIG. 5 is a perspective view showing a preferred embodiment of a threaded fastener according to the present invention;

FIG. 6 is an enlarged perspective view showing one embodiment of the irregular surface configuration placed on the load bearing flank of the threads of a threaded fastener member according to the present invention;

FIG. 7 is a sectional view taken along the helix angle of the thread taken generally along the line 7—7 of FIG. 6 diagrammatically showing the orientation of the irregular surface configuration on the load bearing flank of a thread;

FIG. 8 is a view similar to FIG. 7 showing an alternate embodiment for the serrations on the flank of the thread;

FIG. 9 is an elevational view taken on the line 9—9 of FIG. 7 with a partial showing of a mating thread configuration;

FIG. 10 is a view similar to FIG. 9 showing an alternate embodiment for the configuration of the serrations; and FIG. 11 is an elevational view taken on the line 11—11 of FIG. 9 and FIG. 11A is an elevational view as in FIG. 11 showing a feature of the invention.

Figure 1:
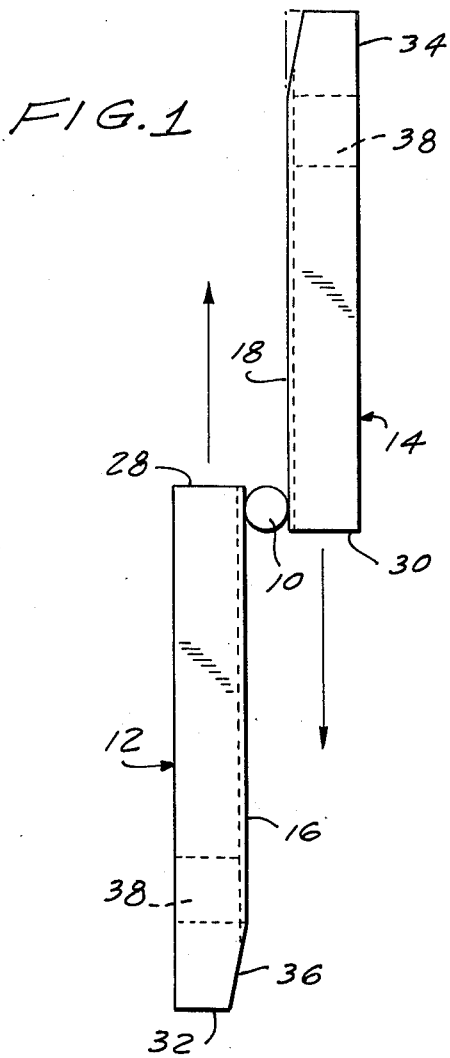
FIG. 1 is a schematic representation showing a pair of flat thread roll dies rolling a thread formation on round stock to form the vibration resistant fastener of the present invention.
Figure 2:
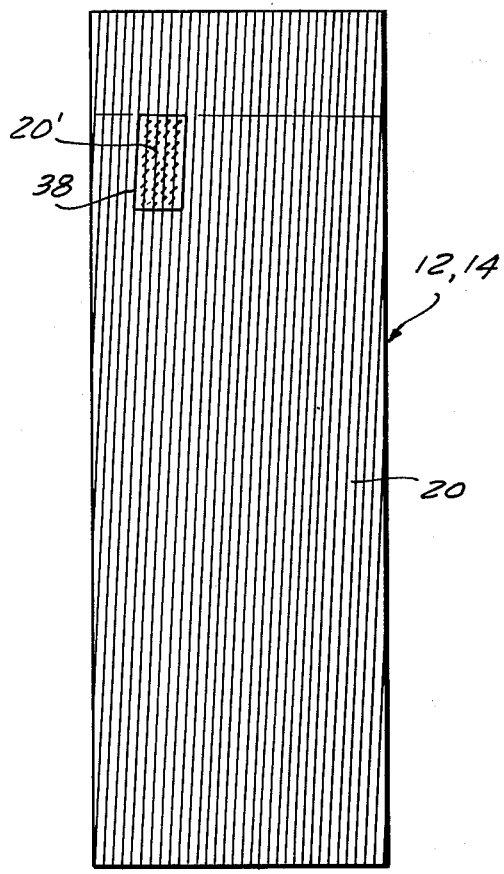
FIG. 2 is a plan view of one of the flat thread roll dies showing the thread forming surface including the segment therein to provide a plurality of serrations on one surface of the thread flanks of a screw rolled within the dies.
Figure 4:
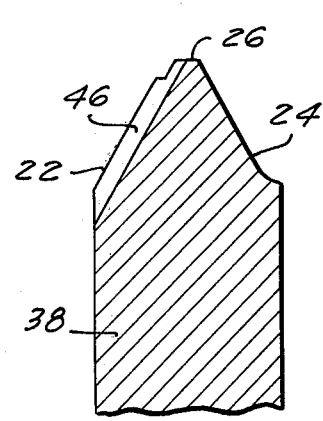
FIG. 4 is a sectional view taken along line 4—4 of FIG. 3.
Figure 3:
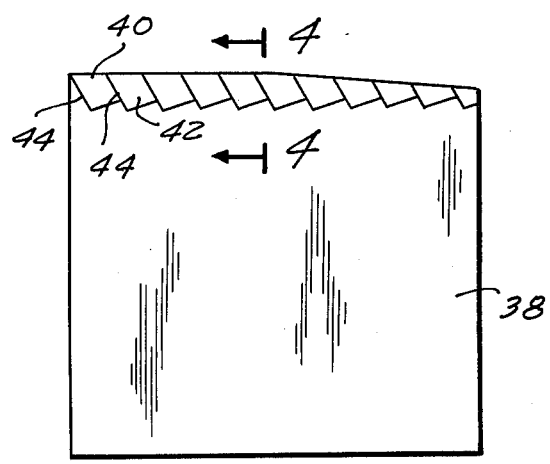
FIG. 3 is an elevational view taken through the segment to form the serrations on the thread flank of a screw rolled within the dies.

With reference to the drawing and particularly FIGS. 1 through 4, there is shown one preferred method of forming a vibration resistant fastener according to the present invention. In this method a round stock member 10 is rolled under pressure between reciprocating dies 12 and 14 to impart a thread configuration and the desired ramp and buttress serrations on the load bearing flank of the formed screw member. It should be understood that circular thread roll dies could be utilized rather than reciprocating dies and that only the latter are disclosed to facilitate an understanding of the invention.

Dies 12 and 14 are rectangular blocks provided with thread-forming surfaces 16 and 18, respectively, on one face of each of the dies. The thread forming surfaces comprise a series of parallel ribs 20 disposed at an angle to the longitudinal axis of the die corresponding to the lead angle of the thread formation to be formed on round stock member 10. Each rib 20 has two inclined surfaces 22 and 24 terminating in a crest 26 to form a conventional helical screw thread on the stock material 10.

To form a screw thread formation on stock material 10 the stock material is placed between the dies 12 and 14 in contact with the thread forming surfaces 16 and 18 adjacent the lead ends 28 and 30, respectively, of the dies. A compressive force is placed on the dies and either one or both of the dies are moved laterally to hold the stock material 10 therebetween and form a screw formation on the stock material 10 as the stock material 10 rotates between the dies.

The thread rolling operation is continued until the stock material 10 is released at the discharge ends 32 and 34, respectively, of the dies. To facilitate removal of the stock material 10 after the screw formation has been impressed thereon, one of the dies 12 is provided with an outwardly inclined ramp 36 which facilitates removal of the stock material 10 from the thread rolling operation.

The ramp and buttress serrations are imparted to the load bearing flank of the threaded fastener by complementary serrations formed within a rectangular shaped segment 38 of each die block 12 and 14. The serrations may be formed on each rib 20' within segment 38 prior to hardening of the die block or may be formed by cutting out a rectangular shaped opening in the die block and inserting a plurality of individual rib segments therein and bonding the individual rib segments within the die block.

Each of the rib segments 20' also includes flanks 22 and 24 terminating on a crest 26 and each are provided with a series of laterally offset steps 40. Each step comprises an inclined portion 42 terminating in an edge 44 which steps down forming a buttress 46. At the base of the buttress 46 the next adjacent incline 44 begins so that the series is continuous to form an inclined buttress and adjacent inclined ramp. Both inclined portion 42 and edge 44 form a skewed angle with crest 26 for purposes which will be made clear hereinafter.

As the stock material 10 is rolled into contact with the segments 38 on the dies 12 and 14, the major thread formation operation has been completed. Continued rotation of the stock material 10 under pressure within the segments 38 on dies 12 and 14 causes the material on one flank of threads formed on the stock material 10 to be further worked by the serrated steps on the rib sections 20' to form a serrated face on the thread flank having a configuration as will be more fully described hereinbelow. Because of the skewed relationship between inclined portion 42 and edge 44 with crest 26, clearance is provided between steps 40 and the serrations formed on the threaded flank which allows the steps to disengage from the serrations as the stock continues rotating. Thus, the skewed relationship functions in a manner somewhat similar to the pressure angle formed on involute gears. Without the skewed relationship, steps 40 would tear the serrations formed on the threaded flank so that the desired form of the latter would be significantly altered.

With reference now to FIGS. 5 through 11 of the drawing, the threaded fastener illustrated is a socket set screw 50 constructed in accordance with the present invention and, as shown, includes a standard thread configuration 52 formed in a thread rolling operation. One end 54 of the screw 50 is provided with a suitable indentation 56 to receive a wrenching member to permit the set screw 50 to be rotated into engagement in a cooperating threaded bore in a workpiece.

As best seen in FIG. 7, the load bearing flank 58 of each individual thread 60, or if desired on the load bearing flanks of at least two adjacent threads, is provided with an irregular serrated configuration 62 around the circumference of the thread to impart a rotation resistant property to the set screw 50 when it is engaged in a threaded receiving bore and a compressive load is impressed on the screw.

When the serrations 62 are viewed along a cylinder concentric with the longitudinal axis of the screw, the serrations are seen to be in the form of teeth. These teeth are generally saw-tooth in shape and each include a vertical wall or buttress 64 extending between the crest 66 of a given tooth and the root 68 of an adjacent tooth. An incline surface or ramp 70 extends between the crest 66 and the root 68 of an adjacent tooth. The ramp 70 of each serration is inclined with respect to a plane parallel to the helix angle of the thread formation of the screw 50 at an angle of between 5° and 25°.

As best seen in FIGS. 7 and 8, a plane passing through the wall or buttress 64 of each serration is skewed with respect to the radial center of the screw 50 with the skew angle being in the range of 15° to 35° with respect to a radius taken from the radial center of screw 50 to the individual serration 60.

As best seen in FIG. 11, the height of buttresses 64 is constant along the flank 58 but it should be understood that it could vary, as shown in FIG. 11A. Also, as best seen in FIGS. 11 and 11A, serrations 62 extend from the crest 74 of thread 60 inwardly of the pitch diameter 72 and terminates adjacent the root of the thread. If fatigue strength of the fastener is not important to its function, serrations 62 could extend to the root, but where fatigue strength is important, the serrations should terminate adjacent the root of the thread so as not to allow the root to be marred thereby detracting from its fatigue strength.

The ramp 70 of each serration 62 is inclined in the direction of rotation of the screw 50 when it is rotated towards its engaging position, i.e. clockwise for a right-hand thread. Thus, during rotation of the screw 50 into engagement within a cooperatively threaded receiving bore in a first workpiece, and before any compressive load is applied to the screw 50, the walls or buttresses 64 of each serration provide no frictional impedance to the rotational engagement of the screw 10. Once the screw is seated so that a workpiece contacting end 76 contacts a second workpiece, or once a compressive load is induced on the screw, further inward movement of the screw 50 becomes restricted. Continual application of a seating torque until a predetermined load is reached impresses a compressive load on the screw 50.

As the compressive load increases on set screw 50, the load bearing flank 58 of each of the threads of the screw 50 is forced into more intimate contact with a mating thread flank in the internally threaded receiving bore in the workpiece in which the set screw 50 is engaged. This compressive force between the load bearing flanks of the mating thread forms results in a substantially elastic deformation of the load bearing flank of the internal thread configuration in the workpiece so that, in essence, the ramp 70 of each serration is depressed into the mating load bearing flank of the internally threaded workpiece, shown at 78 in FIG. 9, so that there is a slight lapping over of the material from the workpiece, as at 80, against the buttress 64. This slight deformation in the internal thread configuration of the workpiece as it abuts against the buttress 64 of each of the serrations 62 precludes rotation of the set screw in the opposite direction which would tend to loosen the set screw or back it off from engagement with the second workpiece.

While the depression is slight at each serration so that an appropriate "off" torque may be applied to loosen the set screw, the locking action provided by the multiplicity of serrations affords sufficient anti-rotation resistance to effectively preclude the set screw from backing off when the workpieces are subjected to vibration. Because the individual deformation adjacent each buttress 64 is essentially elastic in nature, no appreciable damage or distortion results to the thread configuration on either the screw 50 or the mating internal thread configuration of the workpiece in which it is engaged.

In the embodiment shown in FIG. 7, the buttress 64 and crest 66 of each serration are oriented in the same plane at the desired skewed angle to the radial center of the screw 50. Skewing the crest and buttress in this manner provides a greater surface area of contact between the buttress 64 and the mating flank of the thread formation of the threaded bore in a workpiece in which screw 50 is engaged than does a buttress oriented along a radius of the screw.

It has been noted that the skewed orientation of serrations 62 minimizes the tendency of the serrations to tear large chips of material from the internal mating thread as the screw is removed from the workpiece. While not completely understood, it is believed that this results from the compressive load between the serrations and the mating thread are distributed over a larger surface than that provided by a radial orientation so that the unit force between buttresses 64 and the mating thread is less than that provided by a radial orientation. Thus, there is less likelihood of exceeding the elastic limit of the mating thread which, of course, means that there is more likelihood that the deformation of the mating thread is elastic.

In the embodiment shown in FIG. 8, the buttress 64' and crest 66' of each serration are also oriented generally skewed to the radial center of the screw 50'. In this embodiment the crest and buttress are formed in the shape of an arcuate crown or convolute surface. Such a configuration for the buttress and crest increases the surface area of contact still further, as the arcuate path from the innermost portion of each buttress to the outermost portion is slightly greater than the equivalent path of the buttress 64 shown in FIG. 8.

In FIG. 10, a still further embodiment is shown wherein the buttress 64" is inclined rather than vertical as in the embodiment shown in FIG. 6. This embodiment is more fully described in commonly assigned co-pending application Ser. No. 470,874, filed May 17, 1974.

Thus, it is seen that the present invention provides a screw form which exhibits markedly improved rotation resistant properties without deleterious effects which mar or distort either the thread configuration of the screw itself or the mating thread configuration in a workpiece in which it is installed. Thus, the screw may be employed through repeated cycles without noticeable loss of effectiveness.

While the present invention has been described illustratively as a set screw, it is to be expressly understood that the invention may be employed on any type of threaded fastener such as a bolt or screw to be engaged in a threaded bore in a workpiece or to be engaged within a nut.

What is claimed is:

1. A vibration resistant fastener comprising a shank having at least a portion of its length provided with an external thread including a root and a crest, at least a portion of said thread formed with an irregular surface on the flank subjected to a compressive load when said fastener is engaged in a workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging said fastener in the workpiece, said ramp extending from the root to the crest thereof with a buttress extending between said crest and the root of an adjacent serration in a plane generally parallel with the longitudinal axis of said fastener, the height of said buttress between said crest and the root of an adjacent serration being greater at said thread crest than at said point spaced from said thread root, and each said buttress oriented at a skewed angle with respect to the radius from the longitudinal axis of the fastener to said serration.

2. A vibration resistant fastener as defined in claim 1 wherein said skewed angle is within the range having lower and upper limits of about 15° to 35°, respectively.

3. A vibration resistant fastener as defined in claim 1 wherein said buttresses provide no frictional restraint to engagement of said fastener as said fastener is rotationally engaged until a compressive load is induced in said fastener.

4. A vibration resistant fastener as defined in claim 3 wherein said inclined ramp of each of said teeth forms an angle of between 50° and 25° with a plane parallel to the helix angle of said thread.

5. A vibration resistant fastener as defined in claim 1 wherein each buttress is formed to be convolute in shape to define an arcuate path from its inner end to its outermost end.

6. A vibration resistant fastener in combination with a workpiece, said fastener comprising a shank having at least a portion of its length provided with an external thread configuraton including a root and a crest, at least a portion of said thread configuration formed with an irregular surface on the flank subjected to a compressive load when said fastener is engaged in said workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging said fastener in said workpiece, said ramp extending from the root to the crest thereof with a buttress extending between said crest and the root of an adjacent serration, the height of said buttress between said crest and the root of an adjacent serration being greater at said thread crest than at said point spaced from said thread root, said ramp between said root and said crest of each serration being longer than said buttress between said crest and the root of an adjacent serration, each said buttress being oriented at a skewed angle with respect to a radius from the longitudinal axis of the fastener to said tooth, said workpiece having an internally threaded bore to receive said fastener, said irregular surface on said fastener thread flanks adapted to cooperate with the mating thread flanks of said receiving bore upon the inducement of a compressive load in said fastener substantially elastically deforming a portion of the mating thread flanks causing a lapping over of the material of the workpiece against said buttresses to preclude back off of said fastener from an engaged, compressively loaded condition.

7. A vibration resistant fastener and workpiece combination as defined in claim 6 wherein said buttresses provide no frictional restraint to engagement of said fastener as said fastener is rotationally engaged until a compressive load is induced in said fastener.

* * * * *